Sept. 23, 1930.   H. F. GORMSEN   1,776,757
COAL CHUTE
Filed May 29, 1929

WITNESSES

INVENTOR
Harald F. Gormsen
BY
ATTORNEYS

Patented Sept. 23, 1930

1,776,757

UNITED STATES PATENT OFFICE

HARALD F. GORMSEN, OF SCARSDALE, NEW YORK

COAL CHUTE

Application filed May 29, 1929. Serial No. 367,056.

This invention relates to conveyor chutes.

It is among the objects of the present invention to provide a novel and improved chute for the discharge of material from a bin or the like.

A further object of the present invention is to provide a novel and improved covered chute whereby material falling into the chute will enter from the sides thereof.

A further object of the present invention is to provide a covered chute whereby material passing into the chute will not be subject to the pressure of material lying thereover.

A further object of the present invention is to provide a novel and improved covered chute, the cover being spaced from the sides of the chute to prevent entrance of material between the cover and the chute and to prevent pressure of material overlying the chute from restricting the passage of material therethrough.

Other important objects of the present invention include the combination and interrelation of parts whereby the whole forms a novel, simple and improved structure well designed to meet the demands of economic manufacture.

Figure 1:
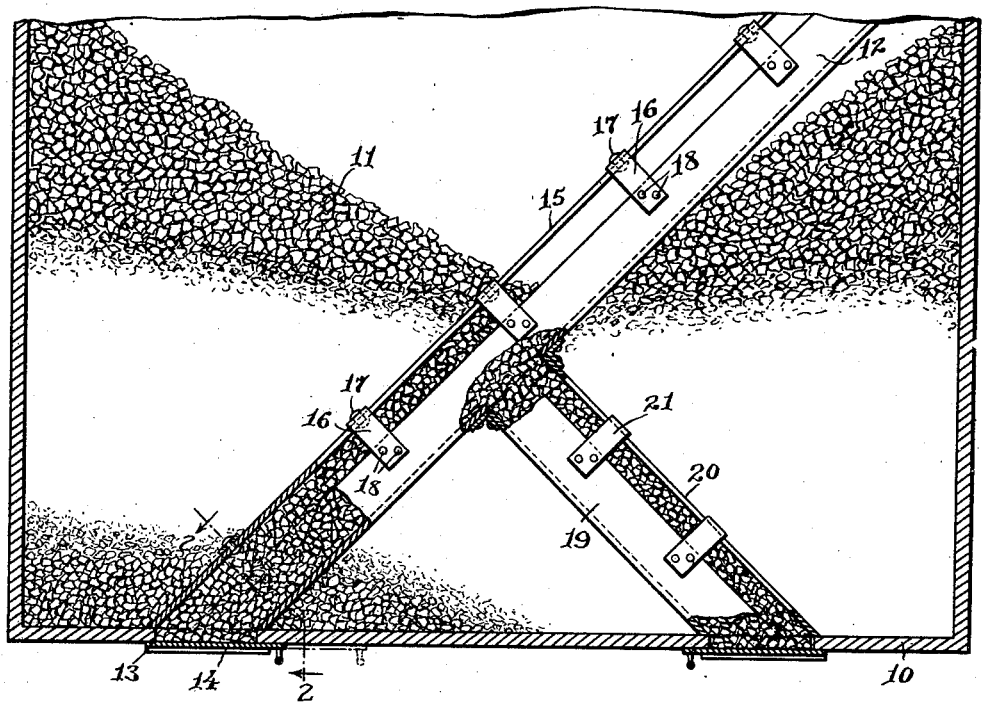
Figure 2:
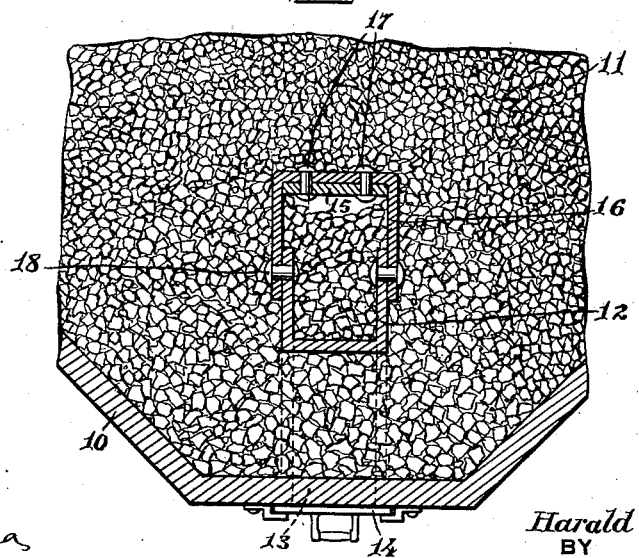

Other objects and features of the present invention will be apparent from a consideration of the following specification taken in conjunction with the accompanying drawings, in which Figure 1 is a vertical section through a material bin provided with the present invention, the chute of the present invention being shown partially in section, and Fig. 2 is a sectional view taken on lines 2—2 of Fig. 1.

Referring more particularly to the drawings, the invention is shown in conjunction with a conventional coal bin. It will readily be seen, however, that the invention is applicable to various types of material bins. It will further be seen that the invention is not confined to the specific rectangular chute construction herein shown and that the device is readily applicable to other forms of chutes, such as the V type chute or the spiral chute.

By the present invention the material in the chute is protected from the weight of material overlying the chute, thus ready discharge from the chute is provided regardless of the amount of material in the bin.

Referring specifically to that form of the invention shown in the drawing, the bin is generally indicated by the numeral 10, the material therein being indicated by the numeral 11. Extending transversely of the bin in the usual fashion, a chute 12 is provided, which is generally U-shaped in cross section as indicated in Fig. 2. The chute extends to the bottom of the bin 10 where it registers with a discharge aperture 13, which may be suitably closed by any convenient type of door, as illustrated by a sliding door 14. It will be understood that the chute 12 may be of any desired cross section and that its position within the bin forms no part of the present invention, the invention being applicable to many different varieties of bins and chutes.

For preventing the lower portion of the chute from being blocked by the pressure of material overlying it, a cover 15 is provided for the chute and is supported thereover in spaced relation by suitable U-shaped bracket members 16 to which the cover 15 is secured by suitable bolts or rivets, as indicated at 17, the brackets being secured to the sides of the chute 12 by suitable securing means 18.

As indicated in Fig. 1, it will be seen that throughout the entire length of the chute which is under the material 11, the cover 15 prevents downward vertical pressure of the material from interfering with the discharge of the material through the chute. It will be readily understood that the material is free to enter the chute by discharge under the cover 15 and that the downward vertical pressure will in no way interfere with such movement of the material. The material within the chute, however, is free to pass downwardly therefrom through the apertures 13 to be discharged to any desired mechanism therebelow.

As an indication of the various modifications to which the invention may be applied, a right-angularly extending chute 19 is provided registering with the intermediate aperture in the chute 12. The chute 19 is also provided with a cover 20 which is supported by the brackets 21 in the manner described in connection with the chute 12 and its cover 15.

From the foregoing it will readily be seen that the invention provides a novel and improved structure which permits free discharge of material from a bin regardless of the weight of the material overlying the discharge chute.

It will be understood that numerous changes and modifications and the full use of equivalents may be resorted to without departing from the spirit or scope of the present invention as outlined in the appended claims.

What is claimed is:

1. The combination with a material bin and inclined gravity discharge chute therein, of means overlying said chute to prevent pressure of said material to effect movement of such material through said chute, said means including a spaced cover for said chute, and brackets carried by said chute for supporting said cover.

2. The combination with a material bin and a substantially U-shaped inclined gravity discharge chute therein, of means overlying said chute to prevent pressure of said material to effect movement of said material through said chute, said means comprising a cover member supported by said chute and extending parallel thereto in spaced relation therefrom.

3. The combination with a material bin and a substantially U-shaped inclined gravity discharge chute therein, of means overlying said chute to prevent pressure of said material to effect movement of said material through said chute, said means comprising a flat cover member supported by said chute and extending parallel thereto in spaced relation therefrom.

4. The combination with a material bin and a substantially U-shaped inclined gravity discharge chute therein, of means overlying said chute to prevent pressure of said material to effect movement of said material through said chute, said means comprising a flat cover supported by said chute and extending parallel thereto in spaced relation therefrom, and substantially U-shaped bracket members carried by the sides of said chute and supporting said cover.

HARALD F. GORMSEN.